(12) United States Patent
Petersen (10) Patent No.: US 8,930,890 B2
(45) Date of Patent: Jan. 6, 2015

(54) SOFTWARE MODEL SKINNING (75) Inventor: Peter H. Petersen, Trenton, NJ (US)

(73) Assignee: International Business Machines Corporation, Armonk, NY (US)

( * ) Notice: Subject to any disclaimer, the term of this patent is extended or adjusted under 35 U.S.C. 154(b) by 2077 days.

(21) Appl. No.: 11/634,435

(22) Filed: Dec. 5, 2006

(65) Prior Publication Data

US 2008/0134137 A1   Jun. 5, 2008

(51) Int. Cl.
*G06F 9/44*   (2006.01)

(52) U.S. Cl.
CPC ... *G06F 8/70* (2013.01); *G06F 8/10* (2013.01)
USPC ............................ 717/105; 717/109; 717/114

(58) Field of Classification Search
CPC .................................. G06F 8/35–8/355; G06F 17/30294–17/30297; G06F 17/30587; G06F 8/34
See application file for complete search history.

(56) References Cited

U.S. PATENT DOCUMENTS

| | | | |
|---|---|---|---|
| 5,195,178 A * | 3/1993 | Krieger et al. ................ | 715/809 |
| 5,249,300 A * | 9/1993 | Bachman et al. .................... | 1/1 |
| 5,659,723 A * | 8/1997 | Dimitrios et al. .................... | 1/1 |
| 6,405,364 B1 | 6/2002 | Bowman-Amuah | |
| 6,502,239 B2 * | 12/2002 | Zgarba et al. ................. | 717/168 |
| 6,609,133 B2 * | 8/2003 | Ng et al. .............................. | 1/1 |
| 6,874,146 B1 * | 3/2005 | Iyengar ......................... | 719/313 |
| 6,898,556 B2 * | 5/2005 | Smocha et al. ............... | 702/186 |
| 6,925,632 B2 * | 8/2005 | Shiu ............................... | 717/121 |
| 7,031,901 B2 * | 4/2006 | Abu El Ata ..................... | 703/21 |
| 7,035,786 B1 * | 4/2006 | Abu El Ata et al. ........... | 703/21 |
| 7,055,131 B2 | 5/2006 | Charisius et al. | |
| 7,096,453 B2 * | 8/2006 | Dionne et al. ................ | 717/105 |
| 7,146,399 B2 * | 12/2006 | Fox et al. ....................... | 709/203 |
| 7,155,380 B2 * | 12/2006 | Hunt et al. ...................... | 703/21 |
| 7,293,254 B2 * | 11/2007 | Bloesch et al. ............... | 717/108 |
| 7,353,159 B2 * | 4/2008 | Armbruster et al. ........... | 703/15 |
| 7,533,365 B1 | 5/2009 | Hogstrom et al. | |
| 7,559,052 B2 * | 7/2009 | Kalia et al. .................... | 717/121 |

(Continued)

FOREIGN PATENT DOCUMENTS

| | | |
|---|---|---|
| DE | 10233971 | 2/2004 |
| EP | 1001338 | 5/2000 |
| WO | 2005106649 | 11/2005 |

OTHER PUBLICATIONS

International Search Report and Written Opinion, Jun. 24, 2008, for International Application No. PCT/EP2007/062989, 10 pp.

(Continued)

*Primary Examiner* — Tuan Q. Dam
*Assistant Examiner* — Zheng Wei
(74) *Attorney, Agent, or Firm* — Janaki K. Davda; Konrad, Raynes, Davda & Victor LLP (57) ABSTRACT

An apparatus, network and methods for skinning normalized meta-model compliant software models are provided. In one embodiment a set of terminology is derived from a software application. A normalized meta-model compliant software model is derived from the application. A "skin" is derived that uses the terminology of the software application. The skin is then applied to the model. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

25 Claims, 8 Drawing Sheets

(56) References Cited

U.S. PATENT DOCUMENTS

| | | | |
|---|---|---|---|
| 7,698,668 B2* | 4/2010 | Balasubramanian et al. | 716/106 |
| 7,735,062 B2 | 6/2010 | de Seabra e Melo et al. | |
| 7,818,682 B2* | 10/2010 | Brand et al. | 715/763 |
| 7,861,218 B2 | 12/2010 | Hussey | |
| 7,882,116 B2* | 2/2011 | Gutz et al. | 707/756 |
| 8,200,589 B2* | 6/2012 | Agrawal et al. | 706/13 |
| 8,209,660 B2* | 6/2012 | Sundararajan et al. | 717/105 |
| 8,266,579 B2* | 9/2012 | Kelly et al. | 717/105 |
| 8,365,138 B2 | 1/2013 | Iborra et al. | |
| 8,429,599 B2 | 4/2013 | Hussey | |
| 2002/0157015 A1* | 10/2002 | Gilbert et al. | 713/200 |
| 2002/0170032 A1 | 11/2002 | Beaven et al. | |
| 2002/0170048 A1* | 11/2002 | Zgarba et al. | 717/168 |
| 2003/0098880 A1* | 5/2003 | Reddy et al. | 345/763 |
| 2003/0115571 A1* | 6/2003 | Phan | 717/105 |
| 2004/0015819 A1 | 1/2004 | Romano-Critchley et al. | |
| 2004/0059556 A1* | 3/2004 | Allen et al. | 703/13 |
| 2004/0148586 A1* | 7/2004 | Gilboa | 717/108 |
| 2004/0260700 A1* | 12/2004 | Wang et al. | 707/10 |
| 2005/0027566 A1* | 2/2005 | Haskell | 705/2 |
| 2005/0039176 A1* | 2/2005 | Fournie | 717/156 |
| 2005/0071805 A1 | 3/2005 | Lauterbach et al. | |
| 2005/0132336 A1* | 6/2005 | Gotwals et al. | 717/127 |
| 2005/0216883 A1* | 9/2005 | Ishimitsu et al. | 717/105 |
| 2006/0041858 A1* | 2/2006 | Yan et al. | 717/105 |
| 2006/0058987 A1 | 3/2006 | Kumar et al. | |
| 2006/0101384 A1 | 5/2006 | Sim-Tang et al. | |
| 2006/0136809 A1* | 6/2006 | Fernstrom | 715/505 |
| 2006/0168555 A1 | 7/2006 | Represas Ferrao et al. | |
| 2006/0168558 A1 | 7/2006 | de Seabra e Melo et al. | |
| 2006/0173669 A1* | 8/2006 | Dreiling et al. | 703/22 |
| 2006/0195460 A1* | 8/2006 | Nori et al. | 707/100 |
| 2006/0241961 A1 | 10/2006 | Tsyganskiy et al. | |
| 2006/0259289 A1 | 11/2006 | Shia | |
| 2006/0265207 A1* | 11/2006 | Gutz et al. | 704/8 |
| 2007/0006132 A1* | 1/2007 | Weinstein et al. | 717/104 |
| 2007/0006135 A1* | 1/2007 | Kraemer | 717/105 |
| 2007/0006177 A1* | 1/2007 | Aiber et al. | 717/136 |
| 2007/0067761 A1* | 3/2007 | Ogilvie et al. | 717/146 |
| 2007/0150322 A1* | 6/2007 | Falchuk et al. | 705/7 |
| 2007/0203754 A1* | 8/2007 | Harrington et al. | 705/3 |
| 2007/0225965 A1* | 9/2007 | Fallen-Bailey et al. | 704/9 |
| 2007/0240109 A1 | 10/2007 | Chandra et al. | |
| 2007/0245297 A1* | 10/2007 | Kuester et al. | 717/104 |
| 2008/0134133 A1* | 6/2008 | DelloStritto et al. | 717/101 |
| 2008/0134136 A1 | 6/2008 | Petersen | |
| 2008/0189235 A1 | 8/2008 | Mital et al. | |
| 2009/0172633 A1 | 7/2009 | Tsyganskiy et al. | |
| 2010/0050152 A1* | 2/2010 | Gilboa | 717/106 |
| 2010/0325603 A1 | 12/2010 | Hussey | |
| 2010/0325606 A1* | 12/2010 | Sundararajan et al. | 717/105 |
| 2013/0166903 A1* | 6/2013 | DelloStritto et al. | 713/151 |

OTHER PUBLICATIONS

International Search Report and Written Opinion, Mar. 27, 2008, for International Application No. PCT/EP2007/062991, 10 pp.

Al-Mashari, M., A. Al-Mudimigh, and M. Zairi, "Enterprise Resource Planning: A Taxonomy of Critical Factors", European Journal of Operational Research, © 2002 Elsevier Science B.V., Total 13 pp.

Amendment 1, Jan. 28, 2011, for U.S. Appl. No. 11/618,415, Total 14 pp.

Office Action 1, Oct. 28, 2010, for U.S. Appl. No. 11/618,415, Total 19 pp.

Final Office Action, dated Apr. 14, 2011, for U.S. Appl. No. 11/618,415, filed Dec. 26, 2006, entitled, "Software Model Normalization and Mediation", invented by P.N. Petersen et al., pp. 1-18.

Response to Final Office Action, dated Jul. 14, 2011, for U.S. Appl. No. 11/618,415, filed Dec. 29, 2006, entitled, "Software Model Normalization and Mediation", invented by P.N. Petersen et al., pp. 1-13.

Notice of Allowance, dated Feb. 3, 2014, for U.S. Appl. No. 11/618,415, filed Dec. 29, 2006, entitled, "Software Model Normalization and Mediation", invented by P.N. Petersen et al., pp. 1-18.

* cited by examiner

SOFTWARE MODEL SKINNING

FIELD OF THE INVENTION

The present invention generally relates to software model derivation. More particularly, the invention concerns applying a skin to software models.

BACKGROUND OF THE INVENTION

Modern Information Technology ("IT") departments are faced with a number of substantial difficulties. Large IT departments may employ a number of programmers and system designers whose responsibilities may include the design, implementation, and maintenance of the companies software. One of the more significant parts of some IT departments includes Enterprise Resource Planning ("ERP") software. These ERP software packages are usually purchased in the form of modules that must be customized and integrated into a custom software application that fits the particular needs of the business. The acquisition of an ERP software package can be a significant expense. Additionally, the planning, implementation, and maintenance of the companies customized application can consume a significant portion of an IT department's manpower and financial resources.

A number of these ERP software packages seek to integrate and support substantial portions of the operations of the company. For example, an ERP package may contain modules for manufacturing oversight, supply chain management, financial management, project management, human resource management, customer relationship management, and data warehousing to name a few. A number of tools and programming languages have been developed to assist in the planning and implementation of a customized software application for a particular business. Some of these tools involve the creation of software models that can interact at a higher level of abstraction with the underlying modules. The creation of models has been standardized by a number of organizations such as the Object Management Group ("OMG").

OMG is a not-for-profit, open membership computer industry specification consortium that is responsible for creating and distributing a number of standards related to software models. Standardization has a number of significant benefits. Software models that conform to the meta-model specifications that standards bodies like OMG adopt can be platform independent which makes them highly portable. Additionally, programmers that are familiar with these models can apply them in a number of different situations. OMG has produced a technical specification for the Unified Modeling Language ("UML") that is may be used to derive models of a software application's structure, behavior and architecture. UML is additionally useful in modeling various business process and data structures needed to operate a business.

Modeling in a UML profile allows precise representation of business processes and rules in a technology independent form. Moving from a technology neutral model to a specific platform requires the transformation of the higher level meta-models into intermediate level models that are specific to the desired technology platform. From these technology or platform specific models there are software tools that can transform the models into software code and associated files that can be used in the customization, and compilation of the customer specific software application. The use of standard compliant meta-models has significantly simplified the process of creating custom software applications from the ERP software packages.

One limitation of this approach is the terminology of the underlying software package is lost in the modeling process. Since these software models are intended for use across a wide range of ERP software packages and a wide range of technology platforms, the terminology used in the models has been standardized to the models. A user, programmer, or system integrator that is familiar with the terminology associated with the underlying software package, the ERP package for example, may not be familiar with the terminology of the model. This can pose a significant difficulty to an IT department in terms of time and costs associated with the development, deployment and maintenance of a custom software application.

Alternatively, an IT department may wish to forego the use of these models in favor of developing their custom application in the native terminology. This presents significant limitations since there are a wide range of software packages that have been developed to interact with these standard meta-models. These packages would not be available to the IT department that foregoes the use of models. Attempts to customize the models to make them more recognizable must be done in a way that does not impact the ability of these packages to interact with the models.

Therefore there exists a need for an apparatus, system and methods to develop custom skins for software models that conform to industry meta-models.

SUMMARY OF THE INVENTION

The present invention provides a system, apparatus and methods for overcoming some of the difficulties presented above. In an exemplary embodiment of a method of configuring a general purpose computer a set of terminology is derived from a software application. A normalized model is then derived from the application. In some instances, the normalized model may conform to a meta-model and may use a standard set of terminology that is different from the software application that it was derived from. A user or system programmer may not be familiar with the set of terminology presented by the model. A "skin" is derived from the original software application. The skin may use the set of terminology that the application uses, and that a programmer or user is more familiar with. The skin is then applied to the model allowing the user or programmer to interact with the model in a more familiar vocabulary.

In another embodiment of a method for configuring a general purpose computer, a model is derived and skinned in the manner described above. A graphical user interface ("GUI") may then be provided that allows a programmer or user to provide their own terminology. This new set of terminology may then be used to replace or modify the terminology used by the skin. In this manner a programmer or user may interact with the model using a custom set of terminology.

BRIEF DESCRIPTION OF THE DRAWINGS

Various embodiments of the present invention taught herein are illustrated by way of example, and not by way of limitation, in the figures of the accompanying drawings, in which.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Information Technology ("IT") departments of companies today have the responsibility of customizing and maintaining significant software resources. These resources can comprise a major investment of the company. In some cases, the core operations of a company are controlled and managed by a software application. These large scale management applications have been called Enterprise Resource Planning ("ERP") systems. ERP systems are typically purchased from a vendor in the form of modules. Various modules in an ERP system may include, but are not limited to, a manufacturing module, supply chain management module, a financial module, a project management module, a human resource management module, a customer relationship management module, and a data warehouse module to name a few. These modules, when integrated in to a custom software package, may be responsible for much of the overall management of a company.

While the present discussion is directed to large scale ERP software applications, the system and methods provided herein may be used with virtually any software. The present invention is therefore not limited with respect to the nature or size of the software various aspects of the present invention interact with.

By way of example and not limitation a manufacturing module may be used to help an engineering department operate in terms of tracking the Bill of Materials ("BOM") cost of products, scheduling manufacturing, and monitoring the capacity of manufacturing. It may provide workflow management utilities, quality control monitoring, manufacturing cost management monitoring and work flow monitoring. A supply chain management module may be responsible for inventory monitoring, supply chain planning, supplier scheduling, purchasing and order entry. A financial management module may include functionality to maintain a general ledger, accounts payable and receivable monitoring, cash management and fixed asset monitoring. A project manager module may include utilities for cost monitoring, billing, time and expense monitoring and activity management. A human resources management module may include utilities for payroll, training, time and attendance monitoring and employee benefits monitoring. A customer relationship management may include utilities to assist sales and marketing. It may track commissions, service, customer contact and call center support. A data warehouse module may maintain all of the data, data structures and architecture of the underlying database on which the ERP system operates. An effectively implemented and managed ERP system may therefore be critical to the ongoing operation of a business.

These ERP systems usually attempt to integrate all data and processes of the business or other organization into a single unified system. Successful customization and integration of a large scale ERP system may include multiple software components, supplied by different vendors, and may be integrated across a significant array of hardware resources. A typical implementation may include a client server network involving a significant "server-farm" consisting of, in some cases hundreds of servers. Some of which may be geographically remote others may be resident in a single location. Typically, a number of servers may be redundant of others in the "server-farm" providing for some level of integrity in case of hardware failure.

Another typical attribute of these ERP systems is they typically attempt to integrate all data into a single unified database or data-store used by the various modules. One typical feature of these ERP systems is that since they are modular in design, a smaller company, or one without significant IT resources, may implement only key portions of an ERP system. One feature of these systems is that are typically designed to be expandable as the need arises. These ERP systems are therefore a significant investment of the companies time and resources.

Before the adoption of ERP systems various departments would typically have their own computer systems and potentially their own client server network. Each of a few departments may rely on a common set of data. Difficulties may arise when one department alters the set of data and another department does not timely receive these alterations. The advantages of integration are therefore apparent. ERP software packages attempt to combine the data, and functionality of previously disparate applications and systems. This allows for the synchronization of data and tasks across multiple processes, departments, and systems. Additionally, full scale integration of an ERP system may help reduce the number of software applications an IT department must support producing a more financially efficient organization.

ERP systems address processes of very wide scope within a company. Accordingly they can comprise very large bodies of software. Customization, implementation, troubleshooting and maintenance of software systems of this scope usually require a significant effort in personnel, software and hardware. In most operations the design and implementation of a customized system may be outsourced to companies that specialize in these systems. Companies specializing in ERP system design, implementation and maintenance usually employ specialists and utilize custom software that has been designed to improve their efficiency. An entire industry has emerged in the design of software tools for interaction with these ERP systems. One such area has developed in modeling of software applications.

In some instances, system designers, integrators, and programmers have found it advantageous to derive and work with software models. Typically, these models may be derived from but are independent of the underlying software implementation. One difficulty that arises in working with models is that if the model is to be applicable across a wide range of customer specific software applications it should conform to a standard meta-model. For the purposes of clarity the term meta-model as used herein refers to an abstraction of an a software model. A model of a model. Typically, these meta-models may adhere to specific industry standards.

One such standards body the Object Management Group ("OMG") is a not-for-profit, open membership computer industry specification consortium that is responsible for creating and distributing a number of standards related to software models. Standardization has a number of significant benefits. Software models that conform to the meta-model specifications that standards bodies like OMG adopt can be platform independent which makes them highly portable. Additionally, programmers that are familiar with these models can apply them in a number of different situations. OMG has produced a technical specification for the Unified Modeling Language ("UML") that is may be used to derive models of a software application's structure, behavior and architecture. UML is additionally useful in modeling various business process and data structures needed to operate a business.

Modeling in a UML profile allows precise representation of business processes and rules in a technology independent form. Moving from a technology neutral model to a specific platform requires the transformation of the higher level meta-models into intermediate level models that are specific to the desired technology platform. From these technology or platform specific models there are software tools that can transform the models into software code and associated files that can be used in the customization, and compilation of the customer specific software application. The use of standard compliant meta-models has significantly simplified the process of creating custom software applications from the ERP software packages. It is important to note that other modeling standards, languages, and environments are known in the art and may be used to practice the present invention. The present invention is therefore not limited in any way to OMG or UML. These are mere exemplars of one embodiment.

One limitation of this approach is the terminology of the underlying software package is lost in the modeling process. Since these software models are intended for use across a wide range of ERP software packages and a wide range of technology platforms, the terminology used in the models has been standardized to the meta-models. Software models derived typically give up the terminology associated with a particular software package in favor of portability. A user, programmer, or system integrator that is familiar with the terminology associated with the underlying software package, the ERP package for example, may not be familiar with the terminology of the model. This can pose a significant difficulty to an IT department or a $3^{rd}$ party integrator in terms of time and costs associated with the development, deployment and maintenance of using an ERP package to derive a custom software application for the company.

Figure 1:
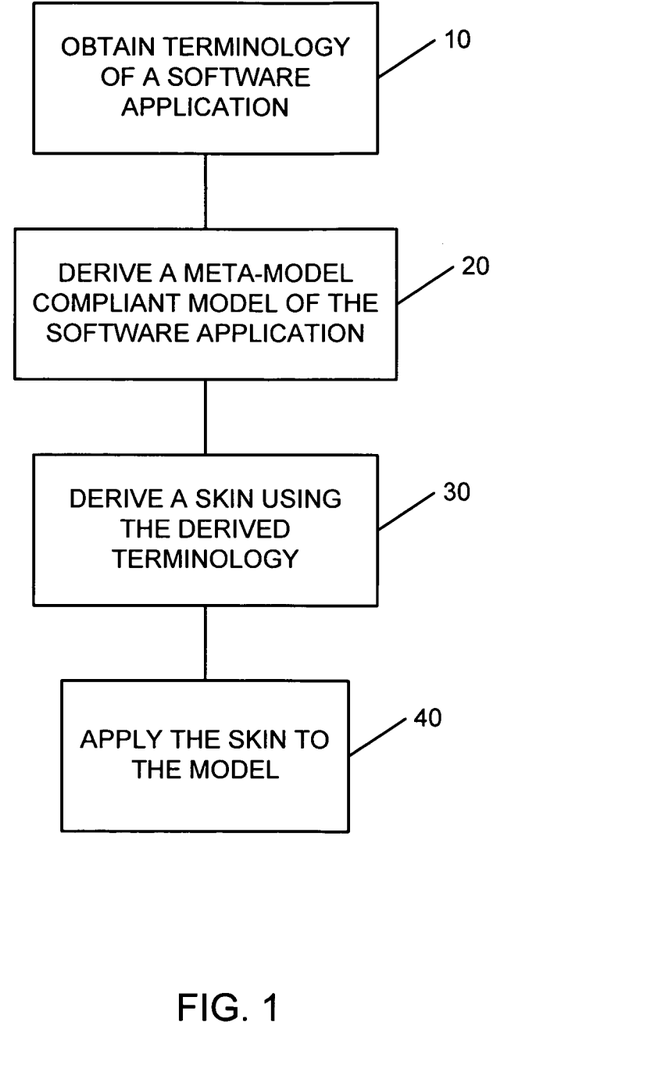
FIG. 1 illustrates a flowchart consistent with one embodiment of a method of configuring a general purpose computer.

One embodiment of a method provided to overcome some of these difficulties is illustrated in FIG. 1. In step 10 the method obtains terminology of a specific software application. This may be accomplished in a number of manners, but in an exemplary embodiment is automated and accomplished through a series of queries on the repositories of the software application. As used herein the term repositories refers to structured, semi-structured, or unstructured data storage elements such as databases, spreadsheets, data stores and the like. In step 20 a meta-model compliant model is derived from the software application. A number of techniques and programming languages for software model derivation are known in the art and may be used to practice the current invention. While the invention is not limited with respect to the particular software modeling environment and language, in an exemplary embodiment UML, as described above is used to derive the models. In step 30 a "skin" is derived that utilizes the terminology of the software application modeled. In step 40 the skin is applied to the meta-model compliant software model.

One feature of this embodiment is that a user, programmer, or system integrator may interact with the model using the more familiar terminology of the underlying software application. For example, a user may be familiar with the terminology set that includes Business Objects, Business Components, Fields, Links and Multi-Value Links. A normalized model, on the other hand, might simply deal with Packages, Classes, Properties and Associations. Such a model may be difficult for that user to understand and work with. By applying a software specific "skin" to the model, a Class could be skinned as a Business Component; a Property skinned as a Field and some Associations skinned as Links and others skinned as Multi-Value Links. A software application can now use this skin to interact with its users using in a much more meaningful vocabulary.

One method of model derivation may include making connections to the repository over an Application Program Interface (API) such as an Open DataBase Connectivity (OBBC) or a Java Database Connectivity (JDBC™) connection. As is known in the art, ODBC and JDBC connections are standardized APIs that allow for database access from software applications. A number of relational database vendors additionally provide custom APIs for interface to their repositories. In the case of JDBC the software applications are typically JAVA™ programs. In other embodiments, an object-relational mapping tool may be used to interface with the repository. (JAVA and JDBC are registered trademarks of Sun Microsystems)

Object-Relational Mapping tools are tools that attempt to simplify the creation of data access layers, automate data access, and/or generate data access code. Object-Relational Mapping tools typically establish a bidirectional link with data in a relational database and objects in code, based on a configuration uncovered though a series of SQL queries. A number of Object-Relational Mapping tools are known in the art and may be used to practice the current invention.

Figure 2:
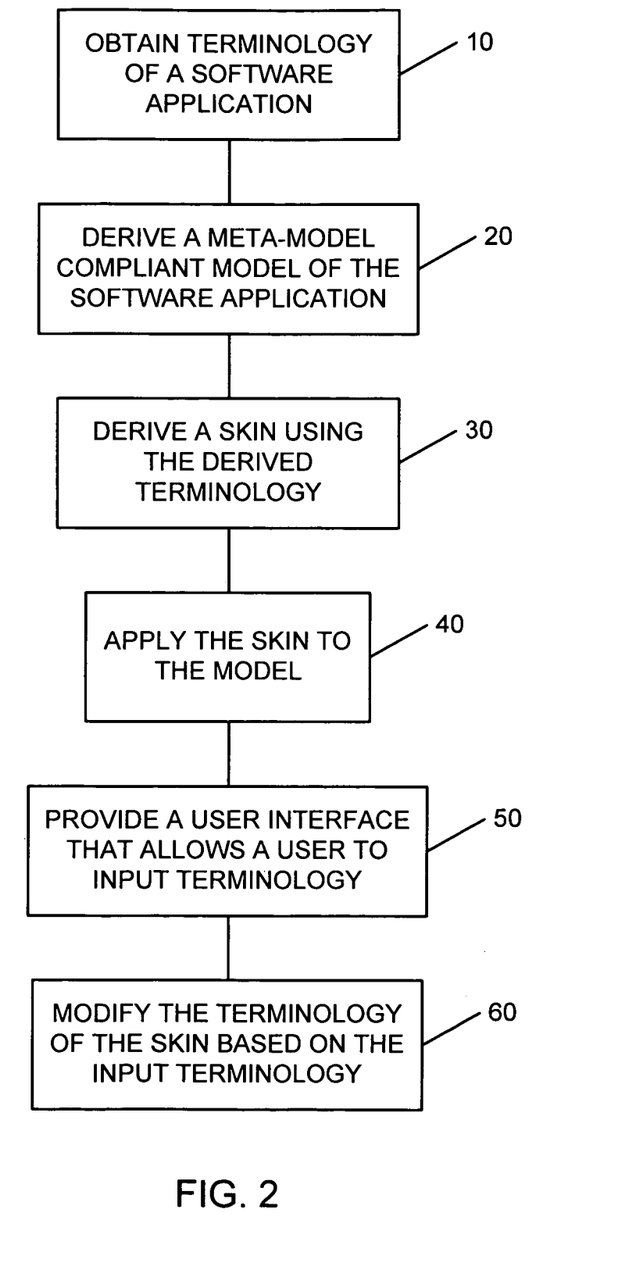
FIG. 2 illustrates flowchart consistent with another embodiment of a method of configuring a general purpose computer.

Another embodiment of a method is illustrated in FIG. 2. In similar manner to the above embodiment, in step 10 the method obtains terminology of a specific software application. In step 20 a meta-model compliant model is derived from the software application. In step 30 a "skin" is derived that utilizes the terminology of the software application modeled. In step 40 the skin is applied to the meta-model compliant software model. This embodiment includes a step 50 where a Graphical User Interface ("GUI") is provided to a user. In this embodiment, the GUI is configured to allow a user to input specific terminology they wish to use for the skin. In step 60 the customer specific terminology is used to replace or modify the skin of the model.

It is important to note that as is the case with a GUI, a skin does not change the software model itself; nor does a skin make the model behave differently, so a common code base can operate on normalized meta-model compliant models regardless of whether they're skinned or not and regardless of the skin. But applications, rules engines and user interfaces may be skin aware and may be able to alter their behavior based on what skin has been applied to a software model.

In one embodiment of the present invention models are derived in the Universal Modeling Language (UML). One software implementation of UML is implemented on top of the Eclipse Modeling Framework (EMF). An exemplary implementation uses the standard Extensible Markup Language Meta-Data Interchange (XMI) format for storing the derived models. As is known in the art, XML allows information and services to be encoded with meaningful structure and semantics that can be customized to user-specific and industry specific tags. XMI is a standardized interchange format that allows the exchange of meta-data information via XML. XMI integrates a number of industry standards including XML, and UML, Meta Object Facility (MOF) to name a few.

Figure 3:
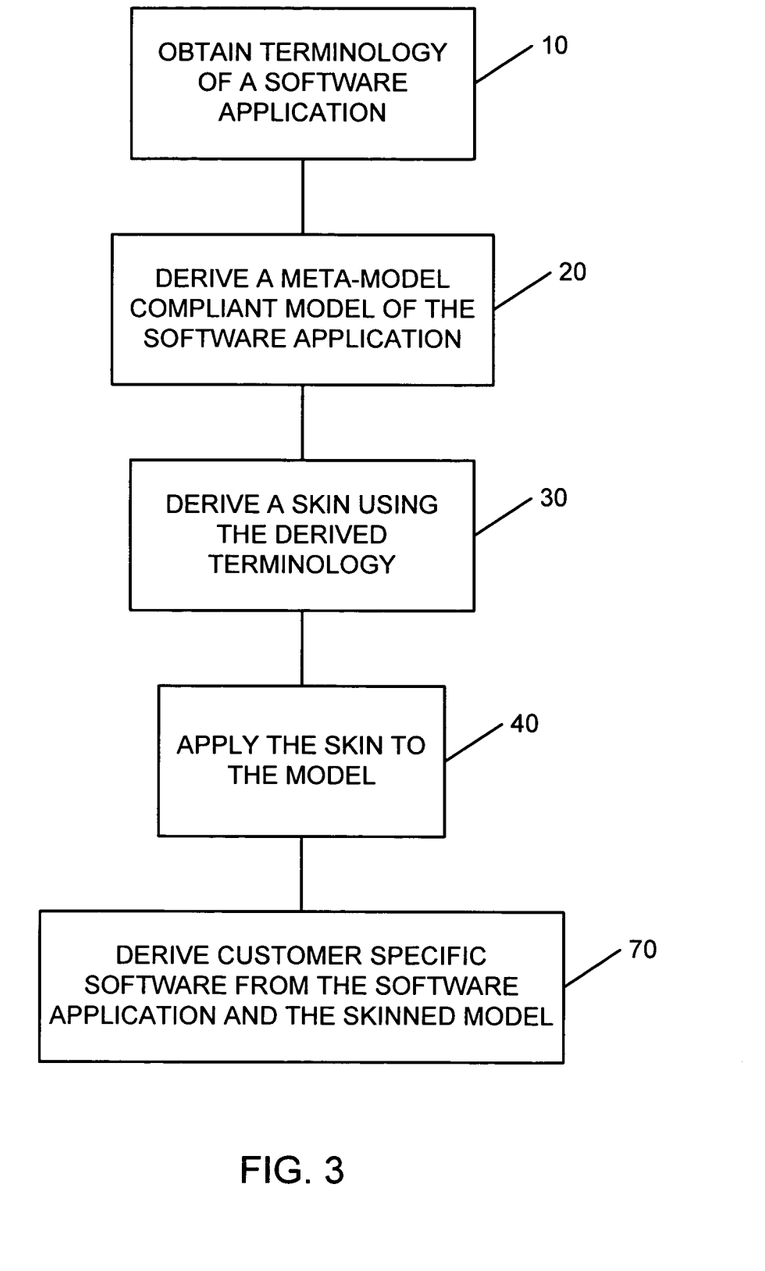
FIG. 3 illustrates flowchart consistent with another embodiment of a method of configuring a general purpose computer.

FIG. 3 illustrates a further embodiment of a method provided herein. In this method, similarly to the above methods, in step 10 the method obtains terminology of a specific software application. In step 20 a meta-model compliant model is derived from the software application. In step 30 a "skin" is derived that utilizes the terminology of the software application modeled. In step 40 the skin is applied to the meta-model compliant software model. In step 70 the skinned models and the software they were derived from are used to derive customer specific software.

As is known in the art, meta-model compliant software models are models whose properties such as construction, rules, constraints are pre-defined. The meta-model may be seen as a further abstraction of the data, architecture, and processes of a repository. A meta-model may be considered as an explicit description in terms of constructs, rules, and the like, that a specific software model should adhere to. In one embodiment of the present invention meta-model compliant models are derived that capture the schema of the repository. One feature of this embodiment is that it allows software using the models to identify the physical tables and columns used by certain objects.

One feature of this embodiment is that a software package may be customized to a particular companies needs through the use of models that have been skinned to make them more user friendly. In some instances, the skins allow programmers, system integrators and other users to interact with the models in a more efficient manner since the skinned models utilize terminology that the users are familiar with.

Figure 4:
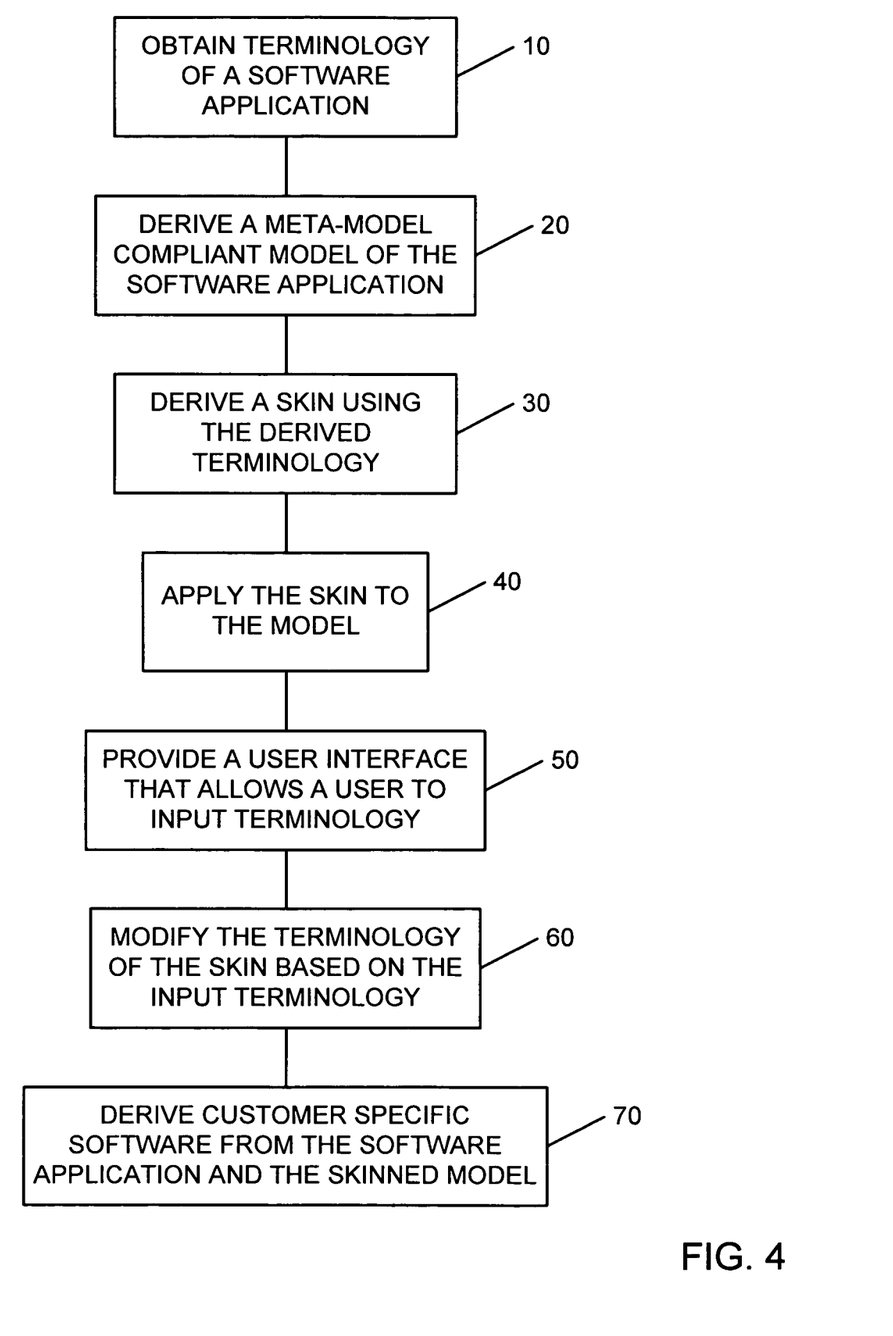
FIG. 4 illustrates flowchart consistent with another embodiment of a method of configuring a general purpose computer.

FIG. 4 illustrates a further embodiment of a method provided herein. Like the above methods this method begins with step 10 where the method obtains terminology of a specific software application. In step 20 a meta-model compliant model is derived from the software application. In step 30 a "skin" is derived that utilizes the terminology of the software application modeled. In step 40 the skin is applied to the meta-model compliant software model. This embodiment includes a step 50 where a Graphical User Interface ("GUI") is provided to a user. In this embodiment, the GUI is configured to allow a user to input specific terminology they wish to use for the skin. In step 60 the customer specific terminology is used to replace or modify the skin of the model. In step 70 the skinned models and the software they were derived from are used to derive customer specific software.

In one embodiment of a method provided, data bindings are utilized to reference the model to the physical schema, or other entity in a data-store. In this embodiment the bindings may be modeled in a manner that allows the software model to be bound to a variety of different underlying data-stores that are not relational in nature. One feature of this embodiment is by modeling the bindings in a meta-model compliant manner, they may be applied in a number of different environments. The bindings may be modeled in the Eclipse Modeling Framework (EMF) or like modeling environment.

Figure 7:
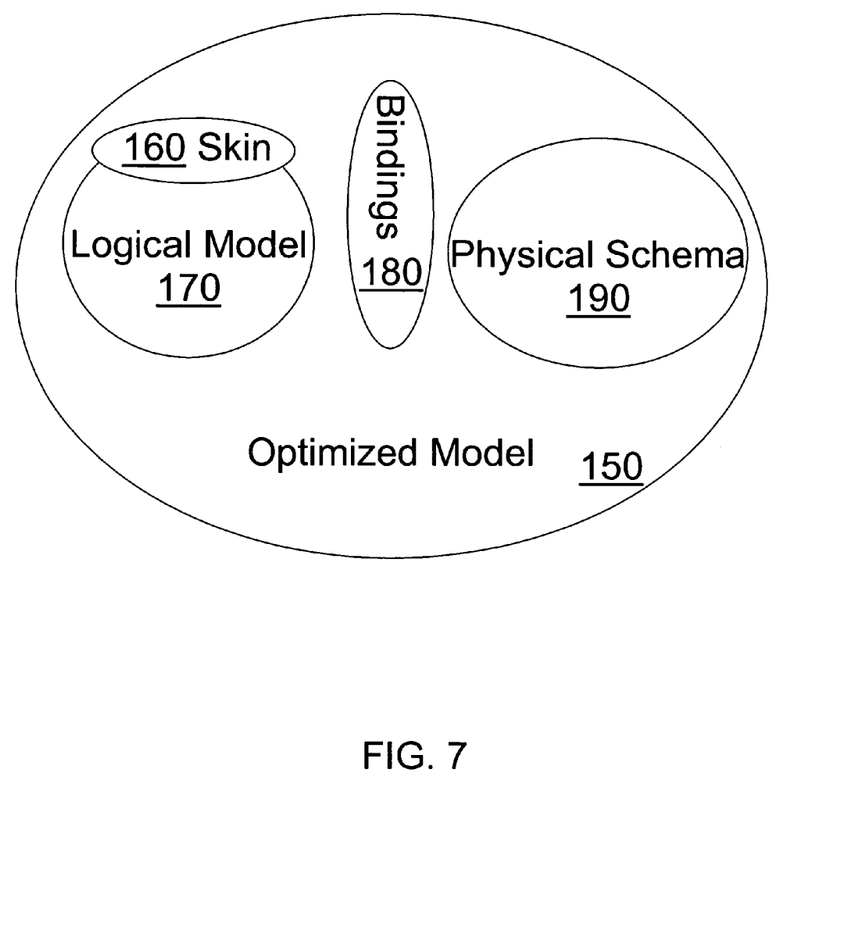
FIG. 7 illustrates an optimized model consistent with various provided embodiments.
Figure 8:
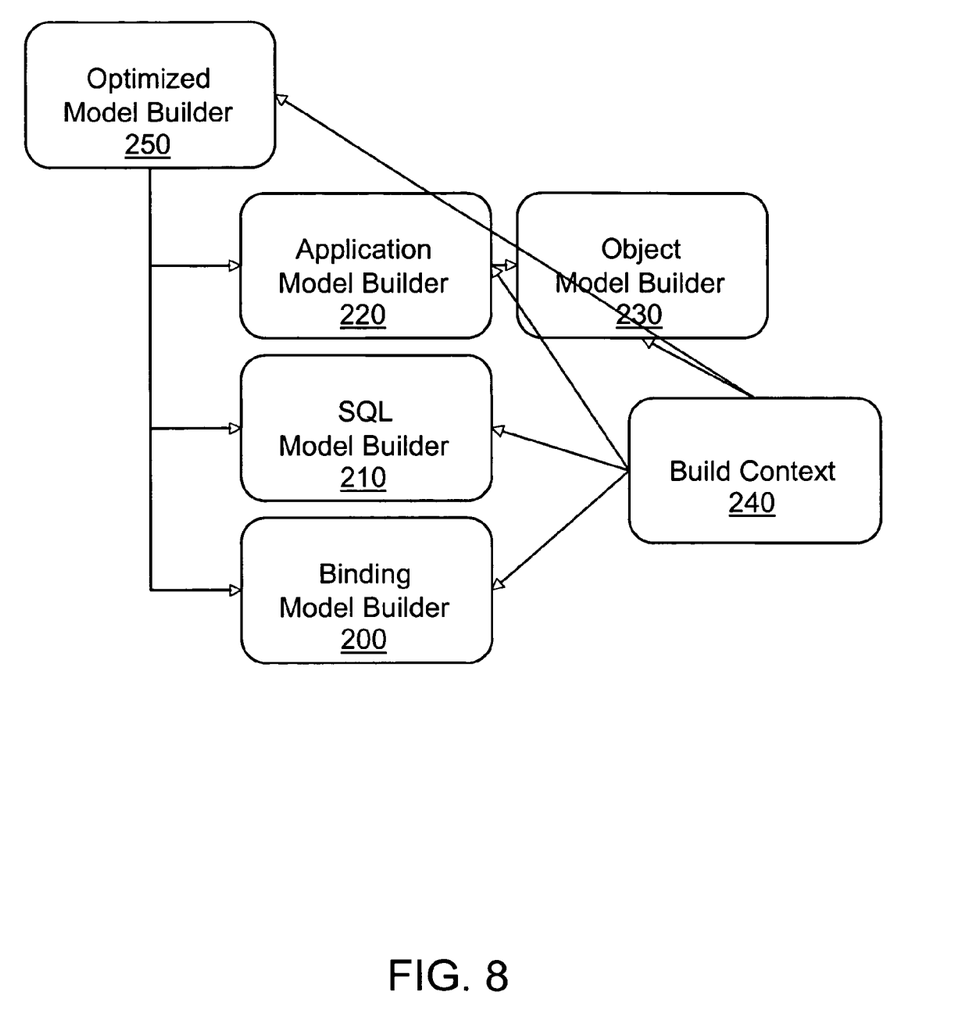
FIG. 8 illustrates one embodiment of the derivation of an optimized model.

Referring to FIG. 7, an optimized model 150 is illustrated. An optimized model 150 may comprise among other things, a logical model 170, bindings 180, and a model of the physical schema 190 or other data-store structure. Consistent with methods provided herein, a "Skin" 160 is developed and applied to the model allowing a user to interact with the model utilizing more familiar terminology. The approach to building optimized models may be extended as illustrated in FIG. 8, where a singular build context 240 is used to derive a number of component models. An optimized model builder 250 may comprise a binding model builder 200, an SQL model builder 210, and an application model builder 220, which may interact with an object model builder 230. These models may be derived to be compliant with and adhere to a meta-model, such as a UML meta-model.

In one embodiment, this context may comprise a set of resources that a particular company is utilizing to build a custom application. This set of resources, such as modules and potentially sub-groups of business objects purchased or licensed from an ERP vendor. The context is then used by the model builders in the derivation of the various models that make up the optimized model.

Figure 5:
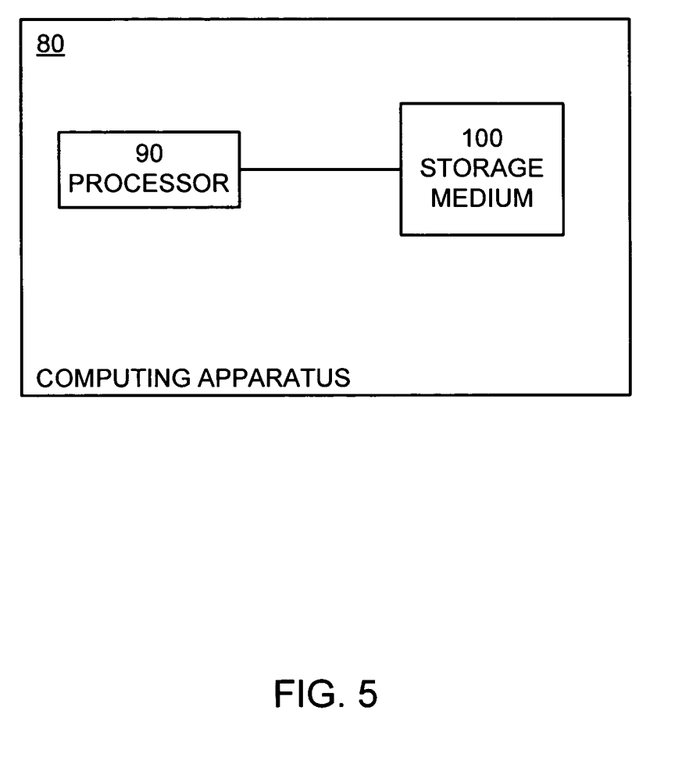
FIG. 5 illustrates an apparatus consistent with one embodiment of a configured computing apparatus.

FIG. 5 illustrates a computing apparatus consistent with one embodiment of the present invention. The computing apparatus 80 may be a general purpose computer comprising a processor 90 and a storage medium 100. It is understood that a computing apparatus 80 would need a number of other components that are omitted from FIG. 5 for convenience. It is understood that computing apparatus 80 may further include a network adapter in some embodiments. In this embodiment a computer software product may be stored on storage medium 100. The computer software product may comprise machine executable instructions that are executed by processor 90. Computing apparatus 80 may be configured to execute the methods described in FIGS. 1-4. Additionally, Computing apparatus 80 may be configured to execute customer specific software that is derived from industry standard software applications and skinned models derived consistent with the embodiments described in FIGS. 3 and 4. In some embodiments, storage medium 100 may include a repository as described above.

Figure 6:
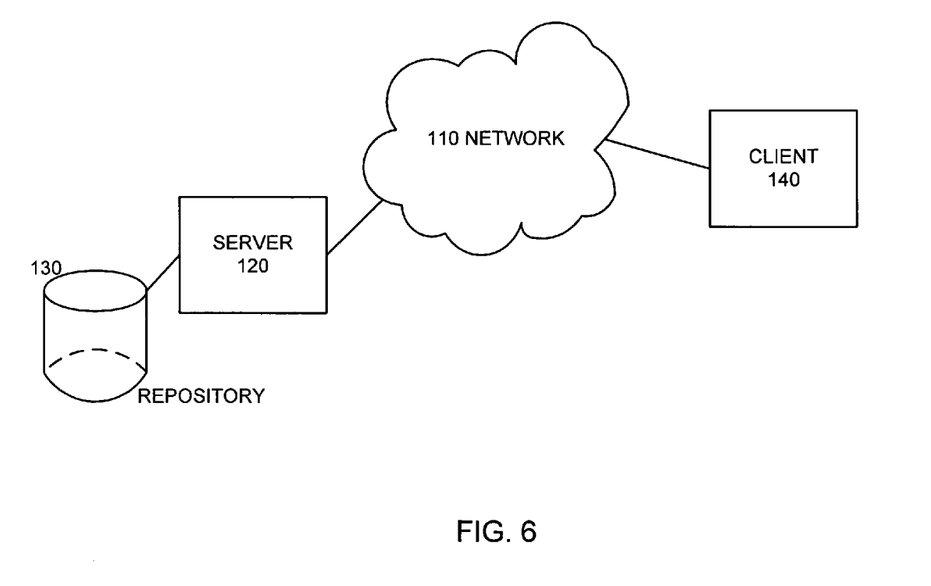
FIG. 6 illustrates an embodiment of a network consistent with features provided herein.

Referring to FIG. 6 which illustrates a network 110 consistent with various disclosed aspects and features. FIG. 6 illustrates a client-server network wherein repository 130 may reside on server 120. In other embodiments, not illustrated, repository 130 may reside on a client device 140. Server 120 and client 140 may be configured to execute software products derived from skinned models and software applications. Additionally, server 120 and client 140 may be utilized to practice the methods described above and illustrated in FIGS. 1-4.

As is known in the art, network 110 may comprise a number of components such as routers, switches, gateways, virtual private network devices, and the like that are not depicted for convenience. Networks 110 can be classified in a number of ways. A network 110 may be classified by the range supported by the underlying technology. For example, some network 110 technologies are designed to provide communication across significant ranges. The Public Switched Telephone Network (PSTN) is a network 110 with almost global reach. Significant portions of the PSTN comprise a wired infrastructure. Portions of the PSTN comprise optical fiber media. Other portions of the PSTN infrastructure may include microwave or radio frequency links communicating across a wireless medium. Wireless and cellular telephone networks interface to the PSTN.

Other types of data networks 110, may or may not interface with voice networks 110. These networks 110 may have essentially global ranges, such as the Internet. These networks 110 may include wireless metropolitan area network technologies such as the technology currently referred to as WiMax. Metropolitan area networks 110 may include wired or optical media as well as a wireless medium. Local area networks 110 may be wired, typically employing twisted-pair wired media, or wireless. Wireless local area networks (WLANs) may include networks 110 employing wireless technologies like Direct Sequence Spread Spectrum (DSSS) or Orthogonal Frequency Division Multiplexing (OFDM). These two wireless technologies are currently the basis for well known WLAN technologies commonly referred to as WiFi or 802.11a, b, and g. Wireless networks may additionally be classified as Wireless Personal Area Networks (WPAN). Typically in WPAN technologies the data rates can be quite significant but the ranges may be limited to under 20 meters. One example of WPAN technology includes a frequency hopping spread spectrum technology, such as the technology currently known as BLUETOOTH (BLUETOOTH is a registered trademark of the Bluetooth Special Interest Group). Other WPAN technologies that are currently under development include Ultra-Wideband, which currently is being implemented as an impulse technology, a DSS technology, and a frequency hopping OFDM technology.

Networks may be additionally, classified by structure. In client-server networks such as the one illustrated in FIG. 6, network 10 may comprise a number of servers 120 (one shown). Additionally, the network 110 may contain a number of clients 140 (one shown). In a typical client-server network 110, clients 140 communicate with servers 20 over network 110. Servers 120 may be located locally within a particular business location where customer service interaction occurs or servers 120 may be remotely located. Network 110 may also include routers, hubs, switches, Virtual Private Network devices, and other devices known in the art (not shown). Since a number of network technologies and classifications are known and some disclosed above, the present invention is not limited with respect to the type of network employed.

Thus, it is seen that a system, apparatus and methods for improved software architectures and models are provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A method of configuring a general purpose computer comprising:
    deriving, with the general purpose computer including a processor, a software model from a software application, the software model conforming to a meta-model and using a first set of terminology for interacting with the software model, the software model capturing a schema of a repository associated with the software application and modeling data bindings to reference the captured schema, and wherein the software application is an enterprise resource planning application;
    obtaining a second set of terminology specific to the software application;
    deriving a skin for the software model using the second set of terminology specific to the software application by mapping the first set of terminology to the second set of terminology;
    applying the skin to the software model;
    receiving user specific terminology for interacting with the software model;
    modifying the second set of terminology of the skin using the user specific terminology, wherein a user interacts with the software model using the modified second set of terminology specific to the software application; and
    deriving a customer specific software application from the software application and the skinned software model.

2. The method of claim 1, wherein obtaining the second set of terminology specific to the software application further comprises executing at least one query on the repository associated with the software application.

3. The method of claim 2, wherein the repository is selected from a group consisting of a database, a spreadsheet, and a data store.

4. The method of claim 1, further comprising:
    providing a user interface configured to allow a user to provide the user specific terminology to interact with the software model.

5. The method of claim 4, wherein the user specific terminology replaces the second set of terminology of the skin.

6. The method of claim 1, wherein the software application comprises a module selected from a group consisting of: a manufacturing module, a supply chain management module, a financial module, a projects module, a human resources module, a customer relationship management module, and a data warehouse module.

7. A computer software product comprising machine executable instructions stored in a non-transitory storage medium, wherein the machine executable instructions, when executed by a processor of a computer, perform:
    deriving a software model from a software application, the software model conforming to a meta-model and using a first set of terminology for interacting with the software model, the software model capturing a schema of a repository associated with the software application and modeling data bindings to reference the captured schema, and wherein the software application is an enterprise resource planning application;
    obtaining a second set of terminology specific to the software application;

deriving a skin for the software model using the second set of terminology specific to the software application by mapping the first set of terminology to the second set of terminology;

applying the skin to the software model;

receiving user specific terminology for interacting with the software model;

modifying the second set of terminology of the skin using the user specific terminology, wherein a user interacts with the software model using the modified second set of terminology specific to the software application; and deriving a customer specific software application from the software application and the skinned software model.

8. The computer software product of claim 7, wherein the second set of terminology specific to the software application is extracted from the software application by executing at least one query on the repository associated with the software application.

9. The computer software product of claim 8, wherein the repository is selected from a group consisting of a database, a spreadsheet, and a data store.

10. The computer software product of claim 7, further comprising a user interface configured to allow a user to provide the user specific terminology to interact with the software model.

11. The computer software product of claim 10, wherein the user specific terminology replaces the second set of terminology of the skin.

12. The computer software product of claim 7, wherein the software application comprises a module selected from a group consisting of: a manufacturing module, a supply chain management module, a financial module, a projects module, a human resources module, a customer relationship management module, and a data warehouse module.

13. A computing apparatus comprising:
a processor; and
a storage media, the storage media containing processor executable software, wherein the processor executable software when executed by the processor performs:
deriving, with the general purpose computer including a processor, a software model from a software application, the software model conforming to a meta-model and using a first set of terminology for interacting with the software model, the software model capturing a schema of a repository associated with the software application and modeling data bindings to reference the captured schema, and wherein the software application is an enterprise resource planning application;
obtaining a second set of terminology specific to the software application;
deriving a skin for the software model using the second set of terminology specific to the software application by mapping the first set of terminology to the second set of terminology;
applying the skin to the software model;
receiving user specific terminology for interacting with the software model;
modifying the second set of terminology of the skin using the user specific terminology, wherein a user interacts with the software model using the modified second set of terminology specific to the software application; and
deriving a customer specific software application from the software application and the skinned software model.

14. The computing apparatus of claim 13, wherein the second set of terminology is extracted from the software application by executing at least one query on the repository of the software application.

15. The computing apparatus of claim 14, wherein the repository is selected from a group consisting of a database, a spreadsheet, and a data store.

16. The computing apparatus of claim 13, further comprising a user interface configured to allow a user to provide the user specific terminology to interact with the software model.

17. The computing apparatus of claim 16, wherein the user specific terminology replaces the second set of terminology of the skin.

18. The computing apparatus of claim 13, wherein the software application comprises a module selected from a group consisting of: a manufacturing module, a supply chain management module, a financial module, a projects module, a human resources module, a customer relationship management module, and a data warehouse module.

19. A communication network comprising:
a server connected to a communication medium; and
a client device connected to the communication medium;
the client device configured to execute a customer specific software application,
the customer specific software application derived from a software application and a software model,
the software model conforming to a meta-model, being derived from the software application, and using a first set of terminology for interacting with the software model, the software model capturing a schema of a repository associated with the software application and modeling data bindings to reference the captured schema, and wherein the software application is an enterprise resource planning application, and
the software model further comprising a skin, and wherein the skin is derived by:
obtaining a second set of terminology specific to the software application to allow interacting with the software model using the second set of terminology specific to the software application;
deriving the skin for the software model using the second set of terminology specific to the software application by mapping the first set of terminology to the second set of terminology;
applying the skin to the software model;
receiving user specific terminology for interacting with the software model; and
modifying the second set of terminology of the skin using the user specific terminology, wherein a user interacts with the software model using the modified second set of terminology specific to the software application.

20. The communication network of claim 19, wherein the second set of terminology is extracted from the software application by executing at least one query on the repository associated with the software application.

21. The communication network of claim 20, wherein the repository is selected from a group consisting of a database, a spreadsheet, and a data store.

22. The communication network of claim 20, wherein the repository resides on the server.

23. The communication network of claim 19, wherein the client is further configured to provide a user interface that is configured to allow a user to provide the user specific terminology to interact with the software model.

24. The communication network of claim 23, wherein the user specific terminology replaces the second set of terminology of the skin.

25. The communication network of claim 19, wherein the software application comprises a module selected from a group consisting of: a manufacturing module, a supply chain management module, a financial module, a projects module, a human resources module, a customer relationship management module, and a data warehouse module.

\* \* \* \* \*